United States Patent
Dong et al.

(10) Patent No.: US 11,270,456 B2
(45) Date of Patent: Mar. 8, 2022

(54) SPATIAL POSITIONING METHOD, SPATIAL POSITIONING DEVICE, SPATIAL POSITIONING SYSTEM AND COMPUTER READABLE MEDIUM

(71) Applicants: Beijing BOE Optoelectronics Technology Co., Ltd., Beijing (CN); BOE TECHNOLOGY GROUP CO., LTD., Beijing (CN)

(72) Inventors: Zehua Dong, Beijing (CN); Hao Zhang, Beijing (CN); Lili Chen, Beijing (CN); Minglei Chu, Beijing (CN); Jiankang Sun, Beijing (CN); Ziqiang Guo, Beijing (CN); Zhanshan Ma, Beijing (CN); Bingxin Liu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/620,680

(22) PCT Filed: Mar. 29, 2019

(86) PCT No.: PCT/CN2019/080303
§ 371 (c)(1),
(2) Date: Dec. 9, 2019

(87) PCT Pub. No.: WO2019/228047
PCT Pub. Date: Dec. 5, 2019

(65) Prior Publication Data
US 2021/0142507 A1    May 13, 2021

(30) Foreign Application Priority Data
May 31, 2018  (CN) .......................... 201810552221.8

(51) Int. Cl.
G06T 7/73    (2017.01)
G06T 7/13    (2017.01)

(52) U.S. Cl.
CPC ............... G06T 7/73 (2017.01); G06T 7/13 (2017.01); G06T 2207/30204 (2013.01)

(58) Field of Classification Search
CPC .... G06T 7/13; G06T 7/73; G06T 2207/30204
See application file for complete search history.

(56) References Cited

U.S. PATENT DOCUMENTS

2012/0242846 A1   9/2012  Iwase
2013/0120581 A1   5/2013  Daniels et al.
(Continued)

FOREIGN PATENT DOCUMENTS

CN    101101505 A    1/2008
CN    101639747 A    2/2010
(Continued)

OTHER PUBLICATIONS

Ikits, Milan, et al. "An improved calibration framework for electromagnetic tracking devices." Proceedings IEEE Virtual Reality 2001. IEEE, 2001.*

(Continued)

*Primary Examiner* — Shefali D Goradia
(74) *Attorney, Agent, or Firm* — Arent Fox LLP; Michael Fainberg

(57) ABSTRACT

The present disclosure discloses a spatial positioning method, a spatial positioning device, a spatial positioning system and a computer readable medium. The spatial positioning method includes: capturing a feature image containing multiple feature markers of a to-be-positioned object; determining coordinate positions of respective feature markers in the feature image in an image coordinate system; traversing the respective feature markers in the image coor- (Continued)

dinate system according to preset multiple standard vector relations, and arbitrarily selecting at least three of the feature markers to calculate vector relations corresponding to the standard vector relations; determining position information of at least three feature markers according to position information corresponding to the standard vector relations in the image coordinate system when it is determined that the calculated vector relations satisfy any standard vector relation.

17 Claims, 7 Drawing Sheets

(56) References Cited

U.S. PATENT DOCUMENTS

| | | | |
|---|---|---|---|
| 2013/0136302 | A1 | 5/2013 | Nam et al. |
| 2017/0032529 | A1 | 2/2017 | DeVilliers et al. |
| 2017/0102467 | A1* | 4/2017 | Nielsen .................. G01S 19/47 |
| 2017/0161951 | A1* | 6/2017 | Fix ...................... G06K 9/00604 |
| 2017/0199099 | A1* | 7/2017 | Chen .................. G01M 11/0264 |
| 2017/0274281 | A1 | 9/2017 | Vandonkelaar |
| 2018/0321776 | A1* | 11/2018 | Averyanov .............. G06F 3/048 |
| 2019/0335292 | A1* | 10/2019 | Leppanen ................. H04S 7/40 |
| 2020/0279396 | A1* | 9/2020 | Komissarov .......... G06T 19/006 |

FOREIGN PATENT DOCUMENTS

| | | |
|---|---|---|
| CN | 101702233 A | 5/2010 |
| CN | 101777123 A | 7/2010 |
| CN | 102694937 A | 9/2012 |
| CN | 103020971 A | 4/2013 |
| CN | 103106404 A | 5/2013 |
| CN | 103136744 A | 6/2013 |
| CN | 105809654 A | 7/2016 |
| CN | 106599929 A | 4/2017 |
| CN | 106648147 A | 5/2017 |
| CN | 107038722 A | 8/2017 |
| JP | 2016224016 A | 12/2016 |
| RU | 2617557 C1 | 4/2017 |

OTHER PUBLICATIONS

Santos, Pedro Carlos, et al. "A real-time low-cost marker-based multiple camera tracking solution for virtual reality applications." Journal of Real-Time Image Processing 5.2 (2010): 121-128.*
Office Action for corresponding Chinese Application No. 201810552221.8 dated Sep. 17, 2021.
Fan et al. "Spatial position measurement system for surgical navigation using 3-D image marker-based tracking tools with compact volume", IEEE Transactions of Biomedical Engineering, vol. 65, No. 2, Feb. 2018.

* cited by examiner

SPATIAL POSITIONING METHOD, SPATIAL POSITIONING DEVICE, SPATIAL POSITIONING SYSTEM AND COMPUTER READABLE MEDIUM

This disclosure is a U.S. National Stage of International Application No. PCT/CN2019/080303, filed Mar. 29, 2019, which claims priority to China Patent Application No. 201810552221.8, filed with the Chinese Patent Office on May 31, 2018 and entitled "A Spatial Positioning Method, Spatial Positioning Device, Spatial Positioning System and Computer Readable Medium", the content of which is hereby incorporated by reference in its entirety.

FIELD

The disclosure relates to the technical field of computers, in particular to a spatial positioning method, spatial positioning device, spatial positioning system and computer readable medium.

BACKGROUND

The spatial positioning technology is important in the virtual reality(VR) industry, which directly affects the performance of VR products and determines the experience effect of users. The standards of the VR industry in the spatial positioning technology include: achieving 6 degree of freedom (DOF), 360° accurate tracking with millimeter-level or higher accuracy, delaying less than 20 ms, refreshing rate greater than 50 Hz, etc.

However, the current spatial positioning method has high requirements on equipment, is difficult to achieve, and is expensive.

SUMMARY

The embodiment of the present disclosure provides a spatial positioning method, including: capturing a feature image containing multiple feature markers of a to-be-positioned object; where at least one surface of the to-be-positioned object has multiple feature markers, and geometric shapes formed by the feature markers on respective surfaces are different; determining coordinate positions of respective feature markers in the feature image in an image coordinate system; traversing the respective feature markers in the image coordinate system according to preset multiple standard vector relations, and arbitrarily selecting at least three of the feature markers to calculate vector relations corresponding to the standard vector relations; and determining position information of the at least three feature markers according to position information corresponding to the standard vector relations in the image coordinate system when it is determined that the calculated vector relation satisfies any standard vector relation.

As a possible implementation, the spatial positioning method provided in the embodiment of the present disclosure also includes determining a relative position relationship between the to-be-positioned object and an image capturing component according to the position information of the feature markers and position information of the image capturing component.

As a possible implementation, in the spatial positioning method provided in the embodiment of the present disclosure, each surface of the to-be-positioned object has multiple feature markers, the geometric shapes formed by the feature markers on respective surfaces are different, and each feature marker has unique position information relative to the to-be-positioned object.

As a possible implementation, in the spatial positioning method provided in the embodiment of the present disclosure, the determining the coordinate positions of the respective feature markers in the feature image in the image coordinate system further includes: performing binarization processing on the captured feature image; extracting contours of the respective feature markers in the feature image subjected to the binarization processing; and determining contour moments of respective feature markers, and taking center-of-mass coordinates of the contour moments of respective feature markers as coordinate positions of respective feature markers in the image coordinate system.

As a possible implementation, in the spatial positioning method provided in the embodiment of the present disclosure, the arbitrarily selecting the at least three of the feature markers to calculate the vector relations corresponding to the standard vector relations further includes: arbitrarily selecting at least four of the feature markers, and normalizing coordinates of the selected at least four feature markers to determine the normalized coordinates; calculating vectors of other feature markers to one of the at least four feature markers according to the normalized coordinates, and summing the vectors; and determining a first included angle between the vector sum and a set coordinate axis of a coordinate system corresponding to the normalized coordinates; and determining whether the calculated vector relation satisfies any standard vector relation, further including: determining whether the first included angle is within a range of a first threshold value or not.

As a possible implementation, in the spatial positioning method provided in the embodiment of the present disclosure, the arbitrarily selecting the at least three of the feature markers to calculate the vector relations corresponding to the standard vector relations further includes: arbitrarily selecting at least four and even number of the feature markers, and normalizing coordinates of the selected at least four feature markers to determine the normalized coordinates; calculating vectors between every two feature markers according to the normalized coordinates; and determining second included angles between any two vectors with no intersection; and determining whether the calculated vector relation satisfies any standard vector relation, further including: determining whether the respective second included angles are within a range of a second threshold value.

As a possible implementation, in the spatial positioning method provided in the embodiment of the present disclosure, the normalizing the coordinates of the selected at least four feature markers to determine the normalized coordinates further includes: selecting one of the feature markers as an origin of the coordinate system corresponding to the normalized coordinates; calculating distances from the other feature markers to the origin; and selecting a longest distance among the distances as a standard, and normalizing coordinates of other feature markers to obtain normalized coordinates of the other feature markers.

As a possible implementation, in the spatial positioning method provided in the embodiment of the present disclosure, the determining the position information of the at least three feature markers according to the position information corresponding to the standard vector relations in the image coordinate system further includes: determining a geometric shape to which the at least three feature markers belong according to the standard vector relation; and determining the position information of the respective feature markers in the geometric shape according to distance information and relative position relations among the at least three feature markers.

As a possible implementation, in the spatial positioning method provided in the embodiment of the present disclosure, there are multiple standard vector relations corresponding to a geometric shape; and determining whether the calculated vector relation satisfies any standard vector relation further includes: determining whether the calculated vector relations satisfy all standard vector relations corresponding to one geometric shape.

In another aspect, the embodiment of the presents disclosure also provides a spatial positioning device, including: an image capturing component, configured for capturing a feature image containing multiple feature markers of a to-be-positioned object; where at least one surface of the to-be-positioned object has multiple feature markers, and geometric shapes formed by the feature markers on respective surfaces are different; and a data processing component, including: a coordinate determination element, configured for determining coordinate positions of respective feature markers in the feature image in the image coordinate system; a calculation element, configured for traversing all feature markers in the image coordinate system according to preset multiple standard vector relations, arbitrarily selecting at least three of the feature markers to calculate the vector relations corresponding to the standard vector relations, and determining whether the calculated vector relations satisfy any standard vector relation; and a positioning element, configured for determining the position information of the at least three feature markers according to position information corresponding to the standard vector relations in the image coordinate system when it is determined that the calculated vector relations satisfy any standard vector relation.

In a possible implementation method, in the spatial positioning device provided in the embodiment of the present disclosure, the positioning element is also configured for determining a relative position relationship between the to-be-positioned object and the image capturing component according to the position information of the feature markers and position information of the image capturing component.

In a possible implementation method, in the spatial positioning device provided in the embodiment of the present disclosure, the coordinate determination element is further configured for performing binarization processing on the captured feature image; extracting the contours of the respective feature markers in the feature image subjected to the binarization processing; and determining contour moments of respective feature markers, and taking center-of-mass coordinates of the contour moments of respective feature markers as coordinate positions of respective feature markers in the image coordinate system.

In a possible implementation method, in the spatial positioning device provided in the embodiment of the present disclosure, the calculation element is further configured for arbitrarily selecting at least four of the feature markers, and normalizing coordinates of the selected at least four feature markers to determine the normalized coordinates; calculating the vectors of other feature markers to one of the at least four feature markers according to the normalized coordinates, and summing the vectors; determining a first included angle between the vector sum and a set coordinate axis of a coordinate system corresponding to the normalized coordinates; and determining whether the first included angle is within a range of a first threshold value.

In a possible implementation method, in the spatial positioning device provided in the embodiment of the present disclosure, the calculation element is further configured for arbitrarily selecting at least four of the feature markers, and normalizing coordinates of the selected at least four and even number of feature markers to determine the normalized coordinates; calculating vectors between every two feature markers according to the normalized coordinates; determining second included angles between any two vectors with no intersection; and determining whether the respective second included angles are within a range of a second threshold value or not.

In a possible implementation method, in the spatial positioning device provided in the embodiment of the present disclosure, the calculation element is further configured for selecting one of the feature markers as an origin of the coordinate system corresponding to the normalized coordinates; calculating distances from other feature markers to the origin; and selecting a longest distance among the distances as a standard, and normalizing coordinates of other feature markers to obtain normalized coordinates of the other feature markers.

In a possible implementation method, in the spatial positioning device provided in the embodiment of the present disclosure, the positioning element is further configured for determining a geometric shape to which the at least three feature markers belong according to the standard vector relations; and determining the position information of the respective feature markers in the geometric shape according to distance information and relative position relations among the at least three feature markers.

As a possible implementation, in the spatial positioning device provided in the embodiment of the present disclosure, there are multiple standard vector relations corresponding to a geometric shape; and the calculation element is further configured for determining whether the calculated vector relations satisfy all standard vector relations corresponding to any geometric shape.

In another aspect, the embodiment of the present disclosure also provides a spatial positioning system, including: the spatial positioning device provided in the embodiments of the present disclosure and a to-be-positioned object; where at least one surface of the to-be-positioned object is provided with multiple feature markers, and the geometric shapes formed by the feature markers on respective surfaces are different.

In another aspect, the embodiment of the present disclosure also provides a computer readable medium, including program codes configured for enabling a computing device to perform the spatial positioning method provided in the embodiments of the present disclosure when the program codes run on the computing device.

DETAILED DESCRIPTION OF THE EMBODIMENTS

In order to make the purposes, technical solutions and advantages of the present disclosure clearer, the present disclosure will be made in combination with the accompanying drawings below in detail. Obviously, the described embodiments below are only part of the embodiments of the present disclosure, not all of them. Based on the embodiments in the present disclosure, all other embodiments obtained by those ordinary skilled in the art without making inventive labor are within the scope of the present disclosure.

At present, the spatial positioning technology may be classified according to different positioning principles and auxiliary devices. Among them, optical positioning is to shoot helmet images by external cameras and extract key point information such as feature markers, colors, etc., on the helmet. In the case of knowing the three-dimensional coordinates of feature points in the helmet coordinate system, the two-dimensional coordinates of the feature points can be easily obtained according to the images shot by the camera, then, a position and rotation angle of the helmet relative to the camera coordinate system can be calculated according to algorithms, such as POSIT, solvePnP, etc., to perform a real-time 6 DOF position tracking, i.e. spatial positioning can be performed. Among them, a key problem is how to distinguish corresponding relationships between the feature markers in an image and actual three-dimensional coordinates, that is, an identity of each feature marker in the image needs to be known.

The above spatial positioning method requires the following hardware configuration. The Oculus distinguishes respective points (i.e. feature markers) by controlling luminous frequencies of LEDs, is equipped with a coordinate system, and requires special variable frequency light sources. The PSVR adopts visible light, tracks players and devices by colors of the visible light, and also needs to be equipped with motion sensing controllers (such as SONY's PS Eye series). When the above two kinds of equipment need to be used in a large scene, multiple Oculus Constellation or PS Eye arrays are needed to capture markers to obtain a larger space, and the computational complexity and operation cost are high.

Figure 1:
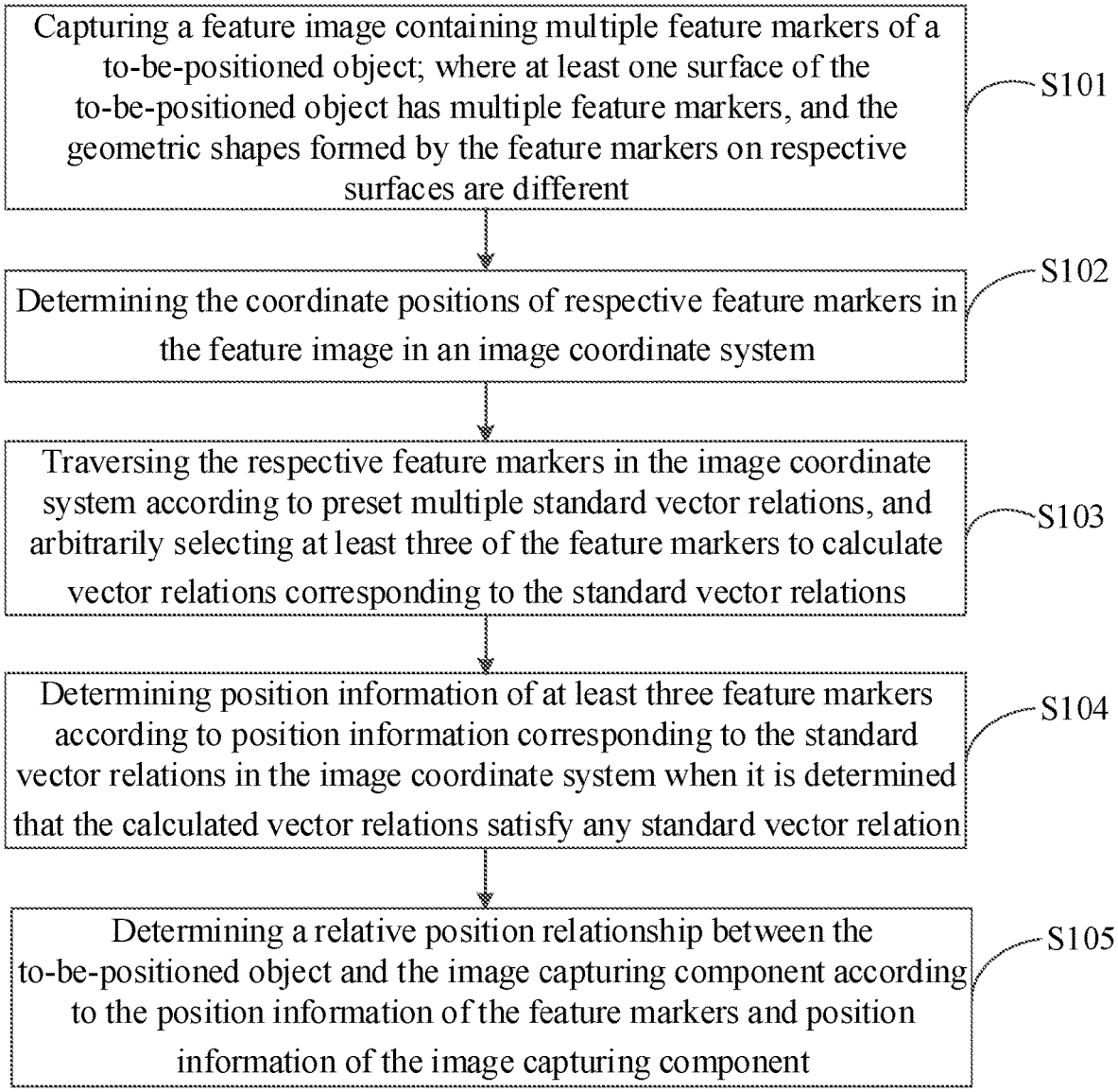
FIG. 1 is a flow diagram of a spatial positioning method provided in the embodiments of the present disclosure.

In view of the above, embodiments of the present disclosure provide a spatial positioning method. As shown in FIG. 1, the method includes the following steps.

S101: capturing a feature image containing multiple feature markers of a to-be-positioned object.

At least one surface of the to-be-positioned object has multiple feature markers, and geometric shapes formed by the feature markers on respective surfaces are different.

S102: determining coordinate positions of respective feature markers in the feature image in an image coordinate system.

S103: traversing the respective feature markers in the image coordinate system according to preset multiple standard vector relations, and arbitrarily selecting at least three of the feature markers to calculate the vector relations corresponding to the standard vector relations.

S104: determining position information of at least three feature markers according to position information corresponding to the standard vector relations in the image coordinate system when it is determined that the calculated vector relations satisfy any standard vector relation.

Optionally, the spatial positioning method provided in the embodiments of the present disclosure also includes the following step.

S105: determining a relative position relationship between the to-be-positioned object and the image capturing component according to the position information of the feature markers and position information of the image capturing component.

Optionally, in the spatial positioning method provided in the embodiments of the present disclosure, each surface of the to-be-positioned object has multiple feature markers, the geometric shapes formed by the feature markers on respective surfaces are different, and each feature marker has unique position information relative to the to-be-positioned object.

Specifically, in the spatial positioning method provided in the embodiments of the present disclosure, multiple infrared Light Emitting Diode (LED) lights can be installed on each surface of the to-be-positioned object as the feature markers, or multiple reflectors can also be arranged on each surface of the to-be-positioned object to be used as the feature markers for illuminating the to-be-positioned object by adopting specific light sources, or multiple other types of luminous bodies can be arranged on each surface of the to-be-positioned object to be used as the feature markers, which will not be limited herein.

Moreover, the number of the feature markers arranged on each surface of the to-be-positioned object can be the same or different, and the number of the feature markers arranged on each surface is generally not less than 3, further generally not less than 4 so that the feature markers on different surfaces form different geometric shapes, so that the feature markers can be distinguished in the subsequent calculation process.

For example, when the to-be-positioned object is a helmet, 11, 8, 4 and 4 infrared LED lights can be respectively fixed on the front, rear, left and right sides of the helmet, and each infrared LED light has a fixed number, so as to match the feature markers satisfying the standard vector relations with the numbers when the step S104 is executed.

Figure 2:
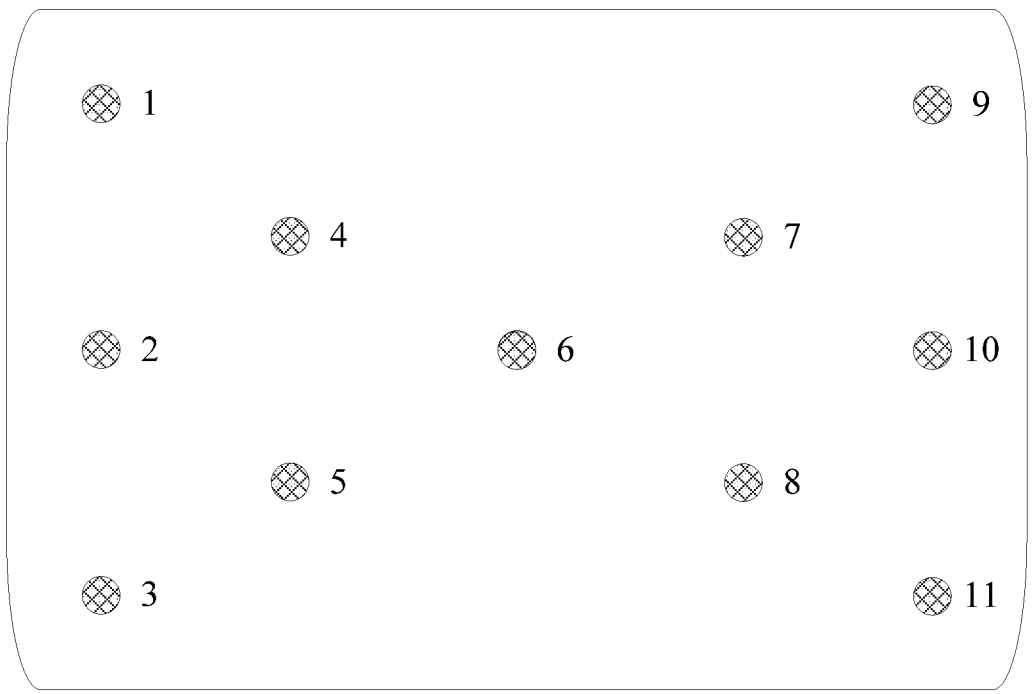
FIG. 2 is a schematic diagram of the front side of a to-be-positioned object in a spatial positioning method provided in the embodiments of the present disclosure.
Figure 3:
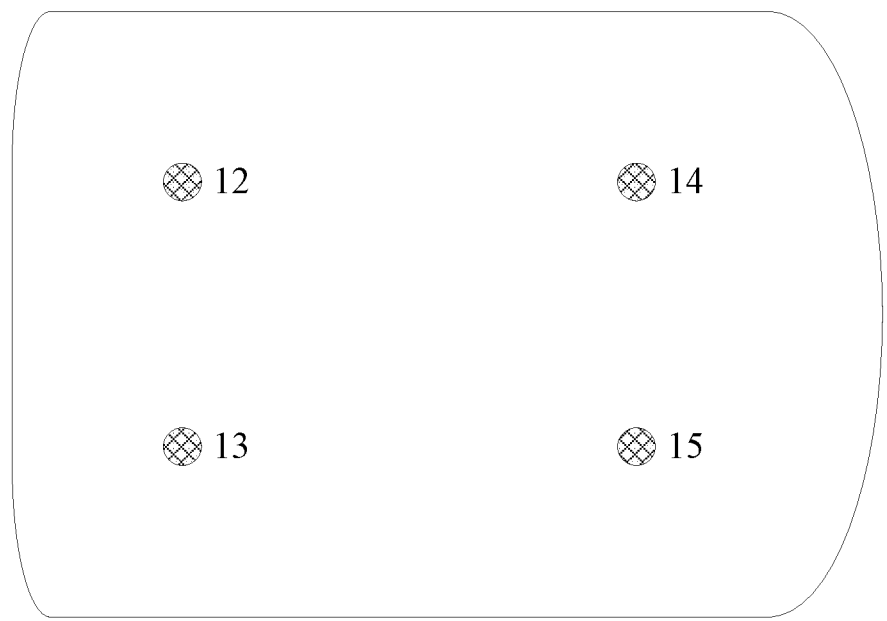
FIG. 3 is a schematic diagram of the right side of the to-be-positioned object in a spatial positioning method provided in the embodiments of the present disclosure.

FIG. 2 shows the distribution of infrared LED lights on the front side of the helmet. FIG. 3 shows the distribution of infrared LED lights on the right side of the helmet. An infrared image capturing device, such as an infrared camera, can be arranged at a fixed position in a selected space to ensure that a feature image containing the helmet can be captured in real time during the movement of the helmet. The feature image contains multiple feature markers for facilitating subsequent spatial positioning of feature markers.

Specifically, in the spatial positioning method provided in the embodiments of the present disclosure, respective surfaces of the to-be-positioned object are provided with multiple feature markers to form different geometric shapes, and the device is fabricated easily and is not expensive, thus reducing the hardware configuration requirements of 360° spatial positioning, and requiring no special variable frequency light source or expensive camera. 360° spatial positioning of the device can be realized under the hardware conditions of such as infrared LED light sources and ordinary infrared cameras.

Then the feature image containing multiple feature markers of the to-be-positioned object is captured. After the coordinate positions of all feature markers in the feature image in the image coordinate system are determined, all feature markers in the image coordinate system are traversed according to the preset multiple standard vector relations, and at least three of the feature markers are arbitrarily selected to calculate the vector relations corresponding to the standard vector relations. When it is determined that the calculated vector relations satisfy any standard vector relation, the position information of at least three feature markers is determined according to the position information corresponding to the standard vector relations in the image coordinate system.

By calculating the vector relations between feature markers, the position information of the feature markers can be quickly determined, and then PnP and other algorithms are used for performing spatial coordinate transformation to achieve spatial positioning. The calculation complexity of the above method is relatively low, so that the delay can be effectively overcome and the dizziness brought to users can be reduced, therefore the method is easy to realize.

Figure 4:
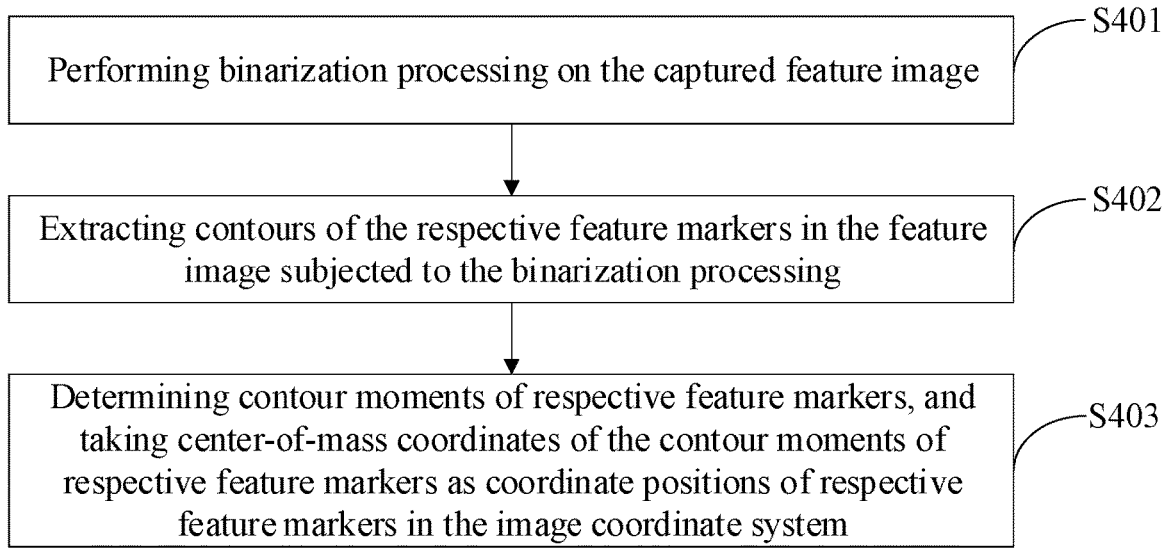
FIG. 4 is a first flow diagram of a spatial positioning method provided in the embodiments of the present disclosure.

Optionally, in the spatial positioning method provided in the embodiments of the present disclosure, the step S102 of determining the coordinate positions of respective feature markers in the feature image in the image coordinate system, as shown in FIG. 4, can be achieved in the following ways.

S401: carrying out binarization processing on the captured feature image.

For example, the captured feature image can be first converted into a grayscale image, and then the grayscale image is subjected to binarization processing.

S402: extracting the contours of the respective feature markers in the feature image subjected to the binarization processing.

S403: determining the contour moments of respective feature markers, and taking the center-of-mass coordinates of the contour moments of respective feature markers as the coordinate positions of respective feature markers in the image coordinate system.

It shall be noted that the image coordinate system is established for the feature image. Generally, a particular point in the feature image is taken as an origin.

For example, the point in the lower left corner in the feature image can be chosen as the origin, and a direction extending rightwards from the origin, that is, the lower edge of the feature image can be chosen as the X axis, and a direction extending upwards from the origin, that is, the left edge of the feature image can be chosen as the Y axis.

Alternatively, a center point of the feature image can be used as the origin; a direction extending rightwards from the origin, that is, the straight line parallel to the lower edge of the feature image can be used as the X axis; and a direction extending upwards from the origin, that is, the straight line parallel to the left edge of the feature image can be used as the Y axis. No limitation will be made herein.

Specifically, when infrared LED lights are adopted as the feature markers, due to imaging characteristics of an infrared camera, the infrared camera may sense infrared light that the human eye cannot distinguish, the feature markers in the captured feature image are in light spot shapes, and the light spots are relatively bright. A threshold value can be set in the above step S401, and the feature image can be converted into a grayscale image, and then the grayscale image is subjected to binarization processing so that the light spots in the feature image are white while other parts in the feature image are all black.

After that, in the above step S402, the contours of all the light spots in the feature image subjected to binarization processing can be extracted, specifically, the contours of the light spots can be determined by edge extraction. Generally, the contour of a light spot is circular or oval.

Finally, in the above step S403, the contour moments are calculated successively, for example, a circular or oval circumscrbing rectangle is calculated as a contour moment, and the center of mass of each light spot is obtained according to the contour moment. For example, the center of the circumscrbing rectangle is taken as the center of mass, and the center-of-mass coordinates are regarded as the coordinate positions of the light spots in the image coordinate system.

Compared with calculation of the center of a circle or ellipse, the center of a circumscrbing rectangle is easier to calculate. Therefore, the coordinate positions of the light spots can be determined quickly and accurately through the above steps S401-S403.

Figure 5:
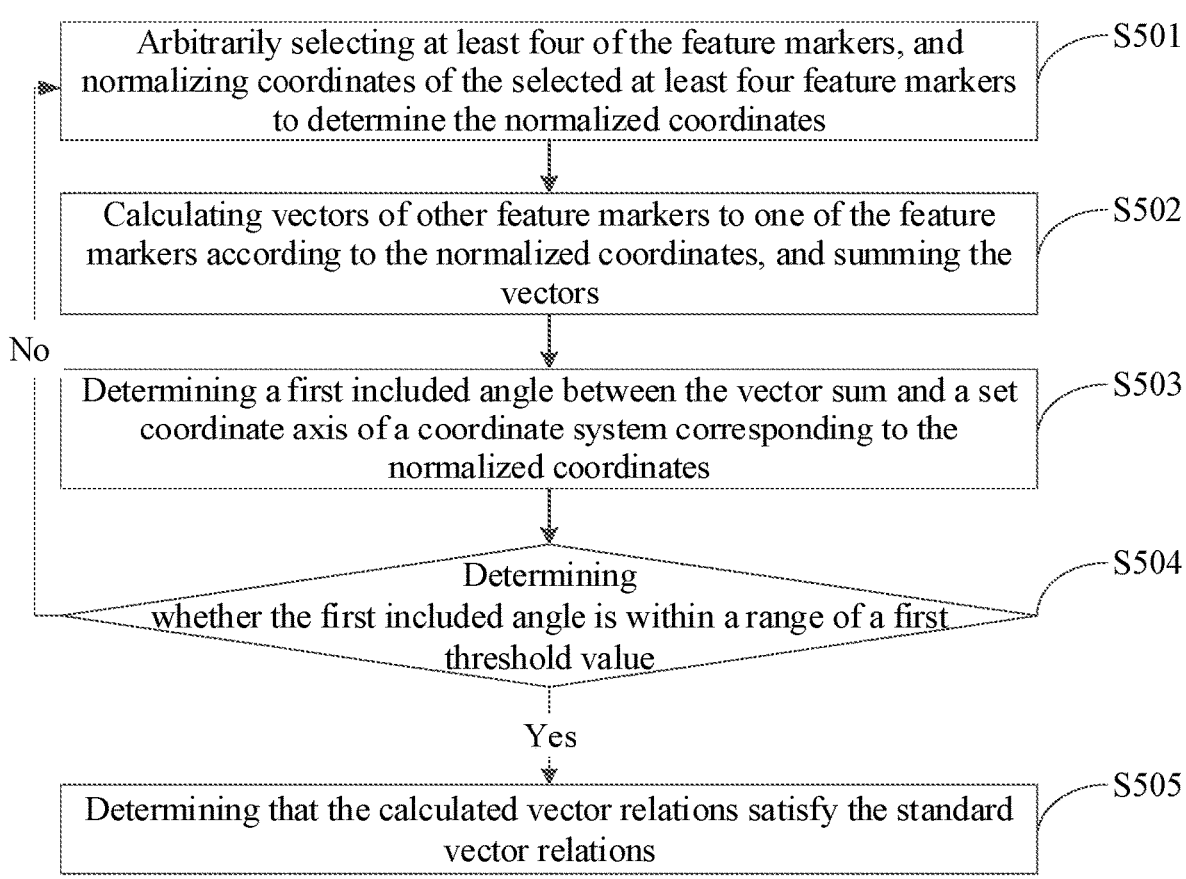
FIG. 5 is a second flow diagram of a spatial positioning method provided in the embodiments of the present disclosure.

Optionally, in the spatial positioning method provided in the embodiments of the present disclosure, the step S103 of traversing respective feature markers according to the preset multiple standard vector relations, and arbitrarily selecting at least three of the feature markers to calculate the vector relations corresponding to the standard vector relations, as shown in FIG. 5 taking four or more feature markers as example, can be realized through the following ways.

S501: arbitrarily selecting at least four of the feature markers, and normalizing coordinates of the selected at least four feature markers to determine the normalized coordinates.

S502: calculating the vectors of other feature markers to one of the at least four feature markers according to the normalized coordinates, and summing the vectors.

S503: determining a first included angle between the vector sum and a set coordinate axis of a coordinate system corresponding to the normalized coordinates.

Determining whether the calculated vector relations satisfy any standard vector relation further includes the following steps.

S504: determining whether the first included angle is within a range of the first threshold value.

If the first included angle is within the range of the first threshold value, it will be determined that the vector relations satisfy the standard vector relation, and then perform the step S505. If the first included angle is not within the range of the first threshold value, it will be determined that the vector relations do not satisfy the standard vector relation, and then return to the step S501.

S505: determining that the calculated vector relations satisfy the standard vector relations.

The set coordinate axis can be such as x axis or y axis.

Specifically, in the spatial positioning method provided in the embodiments of the present disclosure, different standard vector relations can be set in advance according to geometric shapes formed by feature markers on respective surfaces. For example, standard vector relations corresponding to rectangles and polygons may be set. Standard vector relations corresponding to shapes formed after the geometric shapes are deflected for different angles may be set. For example, standard vector relations corresponding to rhombuses formed after rectangles are deflected may be set. Standard vector relations corresponding to the geometric shapes formed by the feature surfaces of the adjacent surfaces may be set. For example, standard vector relations of the parallelogram formed by adjoining four feature vectors in the two adjacent surfaces may be set. No limitation will be made herein.

Take the distribution of infrared LED lights on the right side of the helmet as shown in FIG. 3 as an example. The lights are arranged in the form of a rectangle, and the established standard vector relation, for example, may be the first included angle θ1 within the range of the first threshold value of 30°±10°.

Therefore, in order to determine whether there are feature markers satisfying the standard vector relation in the feature image, four of the feature markers can be arbitrarily selected to perform steps S501 to S505 until a group of feature markers satisfying the standard vector relation is found. When none of the feature vectors satisfy the standard vector relation, whether there are feature markers satisfying the standard vector relation in the feature image is determined according to the next standard vector relation, and so on until feature markers satisfying a certain standard vector relation are found in the feature image.

Figure 7:
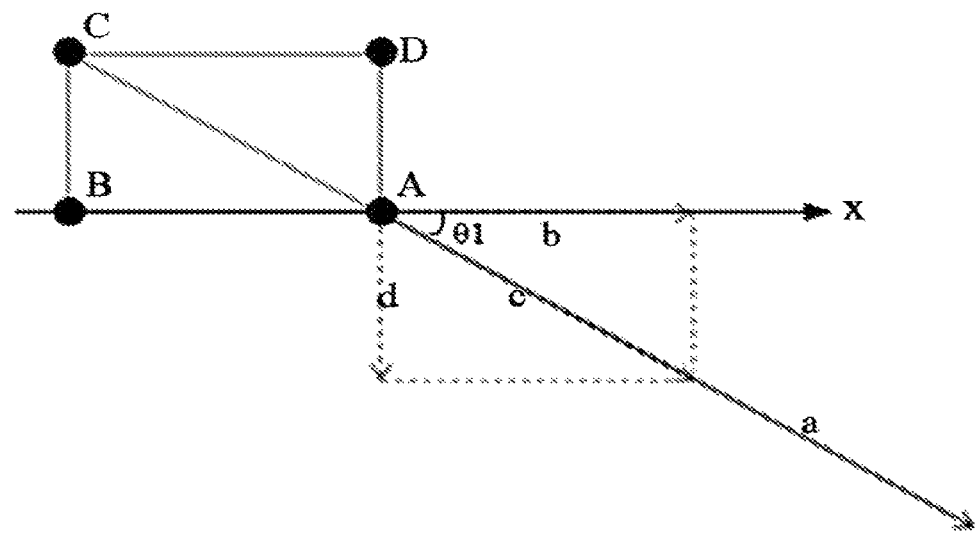
FIG. 7 is a schematic diagram of calculating of vector relations of feature markers in a spatial positioning method provided in the embodiments of the present disclosure.
Figure 8:
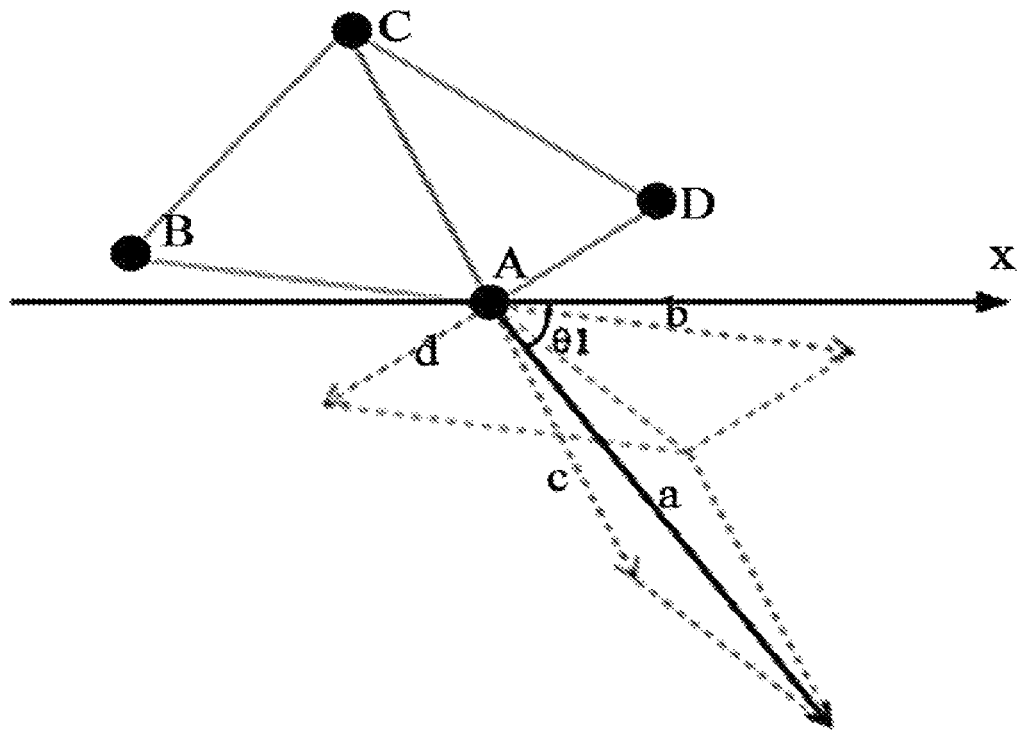
FIG. 8 is another schematic diagram of calculating of vector relations of feature markers in a spatial positioning method provided in the embodiments of the present disclosure.

For example, four feature markers A, B, C and D as shown in FIG. 7 and FIG. 8 are selected, after normalization in the step S501 is carried out, A is taken as the origin. In the step S502, the vectors from feature markers B, C and D to A are calculated to obtain vectors b, c and d, and sum the vectors b, c and d to obtain a vector sum a. In step the S504, whether the first included angle θ1 between the vector sum a, and the coordinate axis x is within 30°±10° is determined, if so, it shows that the vector relations satisfy the standard vector relation.

Figure 6:
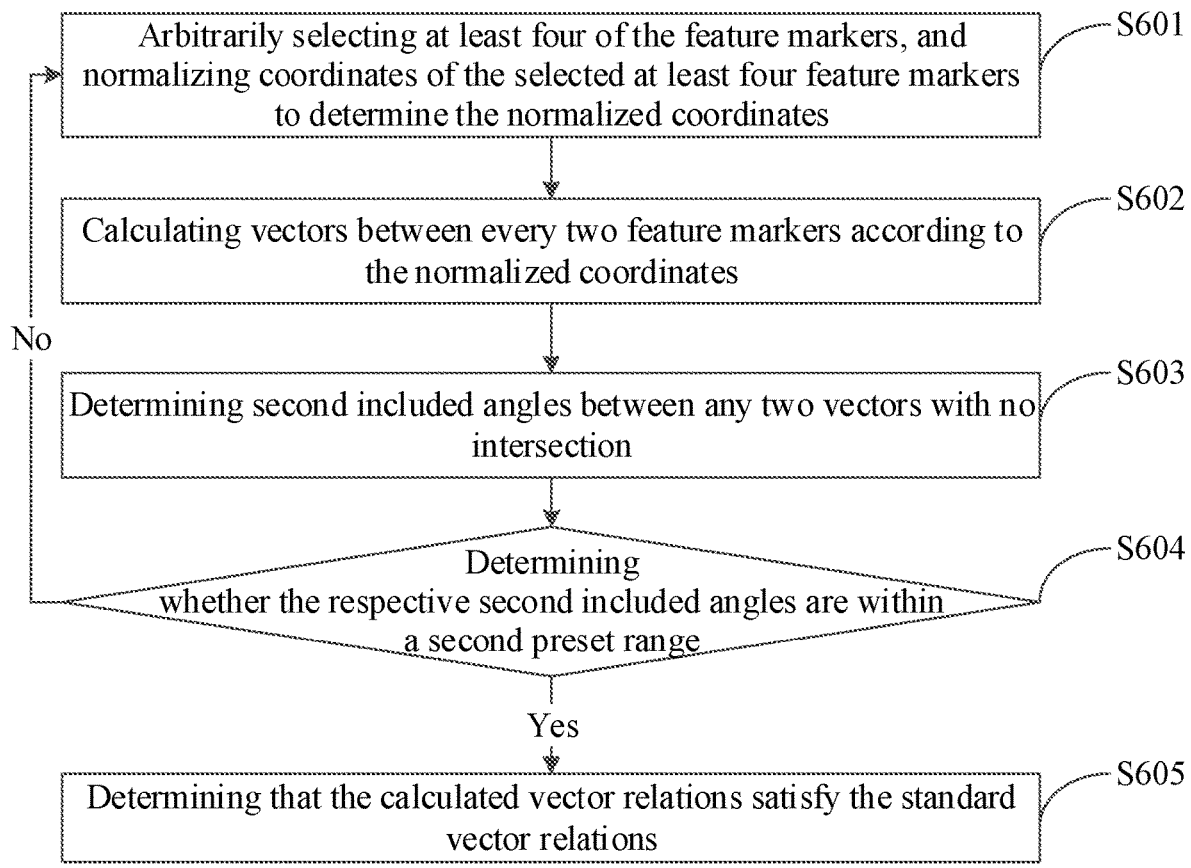
FIG. 6 is a third flow diagram of a spatial positioning method provided in the embodiments of the present disclosure.

Optionally, in the spatial positioning method provided in the embodiments of the present disclosure, the step S103 of traversing respective feature markers according to the preset multiple standard vector relations, and arbitrarily selecting at least three of the feature markers to calculate the vector relations corresponding to the standard vector relations, as shown in FIG. 6, can be realized through the following ways.

S601: arbitrarily selecting at least four and even number of the feature markers, and normalizing coordinates of the selected at least four feature markers to determine the normalized coordinates.

S602: calculating vectors between every two feature markers according to the normalized coordinates.

S603: determining second included angles between any two vectors with no intersection.

Determining whether the calculated vector relations satisfy any standard vector relation, includes the following steps.

S604: determining whether all the second included angles are within the range of the second threshold value. If all the second included angles are within the range of the second threshold value, it will perform the step S605; if all the second included angles are not within the range of the second threshold value, it will return to the step S601.

S605: determining that the calculated vector relations satisfy the standard vector relation.

In particular, the above steps S601 to S605 are another way of determining whether the calculated vector relations satisfy the standard vector relation. Take the distribution of infrared LED lights on the right side of the helmet as shown in FIG. 3 as an example. The lights are arranged in the form of a rectangle, and the established standard vector relations, for example, can be the second included angle θ2 between the two vectors formed by every two opposite side edges, and the second included angles are within the range of the second threshold value of 0°±10°.

Therefore, in order to determine whether there are feature markers satisfying the standard vector relations in the feature image, four of the feature markers can be arbitrarily selected to perform steps S601 to S605 until a group of feature markers satisfying the standard vector relation is found. When none of the feature vectors satisfy the standard vector relation, whether there are feature markers satisfying the standard vector relation in the feature image is determined according to the next standard vector relation, and so on until the feature markers satisfying a certain standard vector relation is determined in the feature image.

Optionally, in the spatial positioning method provided in the embodiments of the present disclosure, the step S501 or step S601 of normalizing coordinates of the selected at least four feature markers to determine the normalized coordinates specifically includes.

First, one of the feature markers is selected as the origin of the coordinate system corresponding to the normalized coordinates. For example, as shown in FIG. 7 and FIG. 8, the feature marker A in the lower right corner is denoted as (0,0).

Then, the distances from other feature markers to the origin are calculated. For example, the distances from feature markers B, C and D to A in FIG. 7 and FIG. 8 are calculated.

Finally, the longest distance among the distances is selected as the standard, and the coordinates of other feature markers are normalized to obtain the normalized coordinates of the feature markers. For example, the distance from the feature marker C to A is the longest as shown in FIG. 7 and FIG. 8, and is used as the standard to normalize other distances.

Specifically, coordinates of the selected at least four feature markers are normalized, so that the calculation of vector relations through the normalized coordinates is facilitated, and comparison with the standard vector relations is convenient.

Optionally, in the spatial positioning method provided in the embodiments of the present disclosure, in order to prevent misjudgment, generally, there are multiple standard vector relations corresponding to one geometric shape, for example, one geometric shape corresponds to two standard vector relations. When whether the calculated the vector relation satisfy any standard vector relation is determined, it is necessary to determine whether the calculated vector relations satisfy all standard vector relations corresponding to the one geometric shape.

For example, when whether the selected four feature markers are located on the right side of the helmet needs to be determined, it is determined that the four feature markers are located on the right side only after determining that the vector relations of the four feature markers simultaneously satisfy the standard vector relations in steps S501 to S505 and the standard vector relations in steps S601 to S605.

Optionally, in the spatial positioning method provided in the embodiments of the present disclosure, the above step S104 of determining the position information of at least three feature markers according to the position information corresponding to the standard vector relations in the image coordinate system specifically includes steps as follows.

First, the geometric shape to which the at least three feature markers belong is determined according to the surface information corresponding to the standard vector relations.

For example, the standard vector relations correspond to the right surface of the helmet, so it is determined that the four feature markers as shown in FIG. 8 belong to the geometric shape in the right side.

Then, the position information of respective feature markers is determined according to the distance information and relative position relations of the at least three features markers.

For example, according to the distance information and relative position relations of the four features markers as shown in FIG. 7, it can be determined that the distances from the feature marker A to the feature marker B and from the feature marker C to the feature marker D are greater than the distances from the feature marker B to the feature marker C and from the feature marker A to the feature marker D. The feature marker A is located in the lower right corner, the feature marker C is located in the upper left corner, the feature marker B is located in the lower left corner, and the feature marker D is located in the upper right corner. After the relative positions of all feature markers are compared with the position information of luminous bodies actually arranged in the to-be-positioned object, the corresponding marker IDs of all feature markers can be determined, it can be determined that the feature marker A in FIG. 7 corresponds to 15 in FIG. 3, the feature marker B in FIG. 7 corresponds to 13 in FIG. 3, the feature marker C in FIG. 7 corresponds to 12 in FIG. 3, the feature marker D in FIG. 7 corresponds to 14 in FIG. 3, and then the positions of the feature markers in the image coordinate system are determined according to the corresponding IDs of the feature markers.

Figure 10:
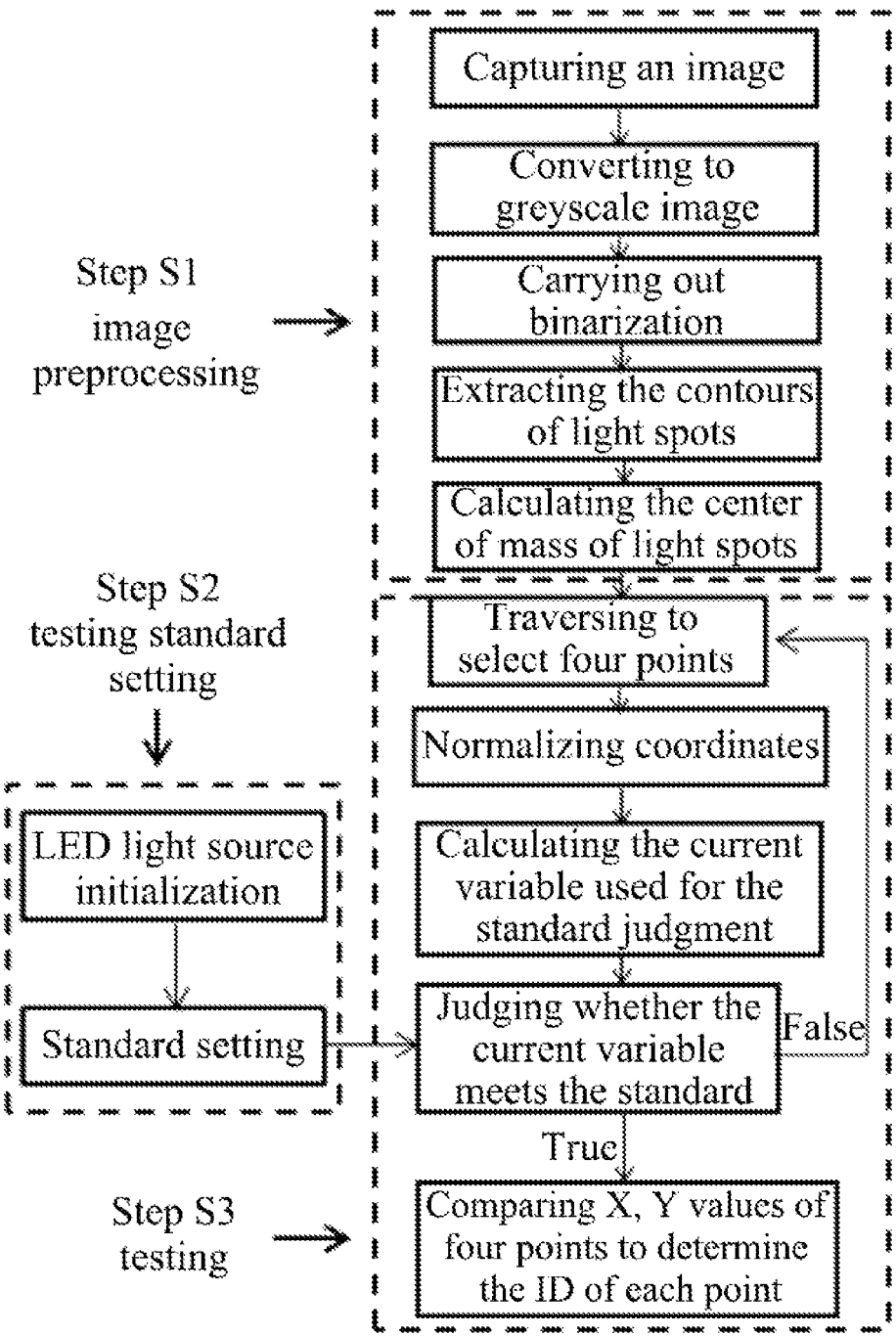
FIG. 10 is a complete flow diagram of a spatial positioning method provided in the embodiments of the present disclosure.

Specifically, FIG. 10 is a complete flow diagram of the spatial positioning method provided in the embodiments of the present disclosure, where step S1 corresponds to the specific realization process in the above steps S101 and S102, step S2 corresponds to how to pre-set standard vector relations, step S3 corresponds to the specific realization process in S103, and no further details will be made herein.

Based on the same inventive concept, the embodiments of the present disclosure also provide a spatial positioning device and system. Since the problem solving principle of the device and the system is similar to that of the spatial positioning method mentioned above, the implementations of the device and the system can be referred to the implementation of the method, and the repetition will not be described again.

Figure 9:
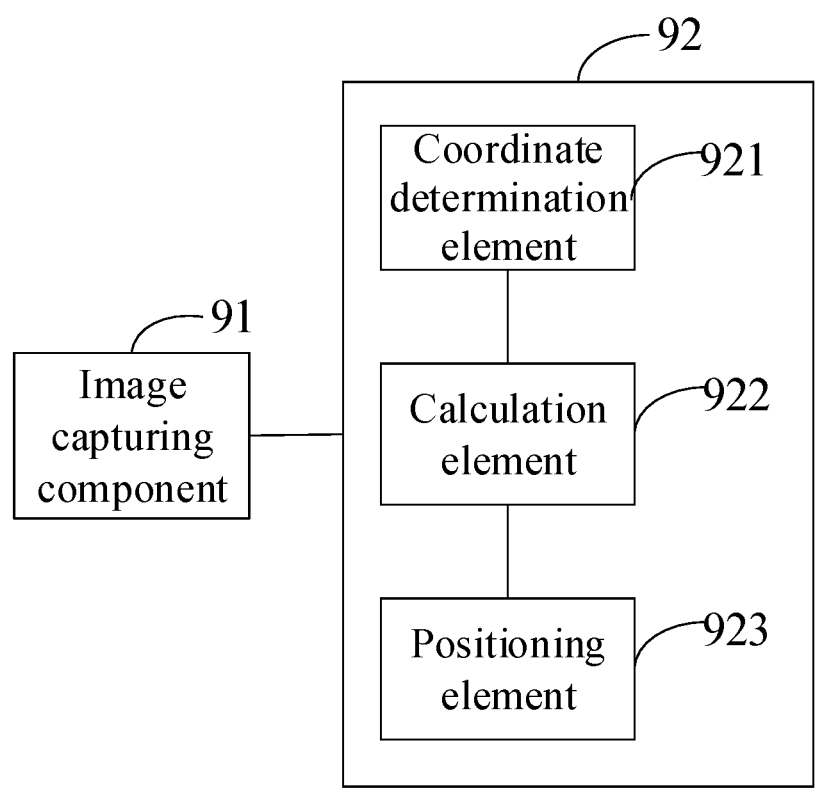
FIG. 9 is a structural schematic diagram of a spatial positioning device provided in the embodiments of the present disclosure.

The spatial positioning device provided in the embodiments of the present disclosure, as shown in FIG. 9, includes: an image capturing component 91 and a data processing component 92.

The image capturing component 91 is configured for capturing a feature image containing multiple feature markers of a to-be-positioned object; at least one surface of the to-be-positioned object has multiple feature markers, and the geometric shapes formed by the feature markers on all surfaces are different.

The data processing component 92 includes: a coordinate determination element 921, a calculation element 922 and a positioning element 923. The data processing component may be a processor.

The coordinate determination element 921 is configured for determining the coordinate positions of all feature markers in the feature image in the image coordinate system.

The calculation element 922 is configured for traversing all feature markers in the image coordinate system according to the preset multiple standard vector relations, arbitrarily selecting at least three of the feature markers to calculate the vector relations corresponding to the standard vector relations, and determining whether the calculated vector relations satisfy any standard vector relation.

The positioning element 923 is configured for determining the position information of at least three feature markers according to the position information corresponding to the standard vector relations in the image coordinate system when it is determined that the calculated vector relations satisfy any standard vector relation.

Optionally, the positioning element is also configured for determining the relative position relationship between the to-be-positioned object and the image capturing component according to the position information of the feature markers and the position information of the image capturing component.

Optionally, in the spatial positioning device provided in the embodiments of the present disclosure, the coordinate determination element 921 is further configured for performing binarization processing on the captured feature image; extracting the contours of the respective feature markers in the feature image subjected to the binarization processing; determining the contour moments of the respective feature markers, and taking the center-of-mass coordinates of the contour moments of the respective feature markers as the coordinate positions of the respective feature markers in the image coordinate system.

Optionally, in the spatial positioning device provided in the embodiments of the present disclosure, the calculation element 922 is further configured for arbitrarily selecting at least four of the feature markers, normalizing coordinates of the selected at least four feature markers to determine the normalized coordinates; calculating the vectors of other feature markers to one of the feature markers according to the normalized coordinates, and summing the vectors; determining the first included angle between the vector sum and the set coordinate axis of a coordinate system corresponding to the normalized coordinates; and determining whether the first included angle is within the range of the first threshold value.

Optionally, in the spatial positioning device provided in the embodiments of the present disclosure, the calculation element 922 is further configured for arbitrarily selecting at least four and even number of feature markers, and normalizing coordinates of the selected at least four feature markers to determine the normalized coordinates; calculating the vectors between every two feature markers according to the normalized coordinates; determining the second included angles between any two vectors with no intersection; and determining whether the respective second included angles are within the range of the second threshold value.

Optionally, in the spatial positioning device provided in the embodiment of the present disclosure, the calculation element 922 is further configured for selecting one of the feature markers as the origin of the coordinate system corresponding to the normalized coordinates; calculating the distances from other feature markers to the origin; selecting the longest distance among the distances as the standard, and normalizing the coordinates of other feature markers to obtain the normalized coordinates of the other feature markers.

Optionally, in the spatial positioning device provided in the embodiments of the present disclosure, the positioning element 923 is further configured for determining the geometric shape to which the at least three feature markers belong according to the surface information corresponding to the standard vector relations; and determining the position information of the respective feature markers in the geometric shape according to the distance information and relative position relations among the at least three feature markers.

Optionally, in the spatial positioning device provided in the embodiments of the present disclosure, there are multiple standard vector relations corresponding to one geometric shape.

The calculation element 922 is further configured for determining whether the calculated vector relations satisfy all standard vector relations corresponding to any geometric shape.

Specifically, in the spatial positioning device provided in the embodiments of the present disclosure, the image capturing component 91 can realize its function by using infrared cameras or infrared CCDs. The data processing component 92 can realize its functions by using programmable logic circuits and other processors.

The spatial positioning system provided in the embodiment of the present disclosure includes: the spatial positioning device provided in the embodiment of the present disclosure, and a to-be-positioned object; at least one surface of the to-be-positioned object has multiple feature markers, and the geometric shapes of the feature markers on all surfaces are different.

Specifically, the to-be-positioned object can be a helmet used in virtual reality.

All components or elements mentioned above may be one or more of processors, single-chip microcomputers, digital signal processors (DSP), application specific integrated circuits (ASIC) and other devices with data processing capability and/or program execution capability. Processors can be selected from central processing unit (CPU), field programmable gate array (FPGA), or tensor processing unit (TPU), etc.

Based on the same inventive concept, the embodiments of the present disclosure also provide a computer readable medium, including program codes configured for enabling a computing device to perform the steps of the spatial positioning method provided in the embodiments of the present disclosure when the program codes run on the computing device.

Since the problem solving principle of the computer readable medium is similar to that of the aforementioned spatial positioning method, the implementation of the computer readable medium can be referred to the implementation of the spatial positioning method, and the repetition will not be described again.

The program product may be any combination of one or more readable media. A readable medium may be a readable signal medium or a readable storage medium. A readable storage medium can be but is not limited to electrical, magnetic, optical, electromagnetic, infrared, or semiconductor systems, equipment or devices, or any combination thereof. A more specific example of the readable storage medium (not exhaustive list) includes: electrical connection having one or more wires, portable disk, hard disk, random access memory (RAM), read-only memory (ROM), erasable programmable read-only memory (EPROM or flash), optical fiber, portable compact disc read-only memory (CD-ROM), optical storage device, magnetic storage device, or any appropriate combination thereof.

Products provided in accordance with the embodiment of the present disclosure may use portable compact disk read-only memory (CD-ROM) and include a program code which may run on server equipment. However, the program products disclosed herein are not limited to this. In this document, a readable storage medium may be any tangible medium containing or storing a program that may be used or used in combination with information transmission equipment or devices.

A readable signal medium may include a data signal propagated in a baseband or as part of a carrier and carrying a readable program code. This propagated data signal may adopt many forms, including but not limited to electromagnetic signals, optical signals, or any suitable combination thereof. A readable signal medium may also be any readable medium other than a readable storage medium and may send, propagate or transmit the program used by or used in combination with a periodic network action system, equipment or device.

The program code contained in the readable medium may be transmitted in any appropriate medium, including but not limited to wireless, wired, cable, RF, etc., or any appropriate combination of the above.

The program code used for performing the operation in the present disclosure can be written in any combination of one or more programming languages. The programming languages include object-oriented programming languages such as Java, C++, and regular procedural programming languages such as "C" or similar programming languages. The program code may be fully executed on the user computing device, partially executed on the user computing device, executed as a separate software package, partially executed on the user computing device, partially executed on the remote computing device, or completely executed on the remote computing device or server. In the case of involving remote computing devices, the remote computing devices can be connected to user computing devices through any kind of network including a local area network (LAN) or wide area network (WAN), or, can be connected to external computing devices.

Through the description of the above embodiments, those skilled in the art can clearly understand that the embodiments of the present disclosure can be implemented by hardware or by means of software and necessary common hardware platform. Based on this understanding, the technical solution of the embodiments of the present disclosure can be manifested in the form of a software product, and the software product can be stored in a non-volatile storage medium (such as CD-ROM, U disk, mobile hard disk, etc.), including several instructions to enable computer equipment (which may be personal computer, server, or network device, etc.) to perform the method provided in all embodiments of the present disclosure.

Those skilled in the art may understand that the drawings are only schematic diagrams of preferred embodiments and that the components or elements or processes in the drawings are not necessarily required to implement the present disclosure.

Those skilled in the art may understand that the components or elements of the device in the embodiments may be distributed in the device in the embodiments according to the description of the embodiments and may vary correspondingly to be located in one or more devices different from the present embodiments. The components or elements of the above embodiments may be combined into one element or further be split into multiple sub-elements or sub-components.

The serial number of the above disclosed embodiments is only for the purpose of description and does not represent the advantages or disadvantages of the embodiments.

Obviously, those skilled in the art can make various changes and variations of the present disclosure without deviating from the spirit and scope of the present disclosure. Thus, if the modifications and variations of the present disclosure fall within the scope of the claims and equivalent technology of the present disclosure, the present disclosure also intends to include such modifications and variations.

The invention claimed is:

1. A spatial positioning method, applied to an infrared image capturing device, wherein the method comprises:
   capturing a feature image containing multiple feature markers of an object that needs to be positioned; wherein at least one surface of the object that needs to be positioned has multiple feature markers, and geometric shapes formed by the feature markers on respective surfaces are different; wherein the feature markers are luminous bodies or reflectors, and when the reflectors are used as the feature markers, the object that needs to be positioned is illuminated by specific light sources;
   determining coordinate positions of respective feature markers in the feature image in an image coordinate system;
   traversing the respective feature markers in the image coordinate system according to preset multiple standard vector relations, and arbitrarily selecting at least three of the feature markers to calculate vector relations corresponding to the standard vector relations;
   determining position information of the at least three feature markers according to position information corresponding to the standard vector relations in the image coordinate system when it is determined that the calculated vector relations satisfy any standard vector relation, and
   determining a relative position relationship between the object that needs to be positioned and an image capturing component, according to the position information of the feature markers and position information of the image capturing component.

2. The spatial positioning method according to claim 1, wherein each surface of the object that needs to be positioned has multiple feature markers, the geometric shapes formed by the feature markers on respective surfaces are different, and each feature marker has unique position information relative to the object that needs to be positioned.

3. The spatial positioning method according to claim 1, wherein, the determining the coordinate positions of the respective feature markers in the feature image in the image coordinate system further comprises:
   performing binarization processing on the captured feature image;
   extracting contours of the respective feature markers in the feature image subjected to the binarization processing; and
   determining contour moments of respective feature markers, and taking center-of-mass coordinates of the contour moments of respective feature markers as coordinate positions of respective feature markers in the image coordinate system.

4. The spatial positioning method according to claim 1, wherein, the arbitrarily selecting the at least three of the feature markers to calculate the vector relations corresponding to the standard vector relations further comprises:
   arbitrarily selecting at least four of the feature markers, and normalizing coordinates of the selected at least four feature markers to determine the normalized coordinates;
   calculating vectors of other feature markers to one of the at least four feature markers according to the normalized coordinates, and summing the vectors; and
   determining a first included angle between the vector sum and a set coordinate axis of a coordinate system corresponding to the normalized coordinates; and
   determining whether the calculated vector relations satisfy any standard vector relation, further comprises:
   determining whether the first included angle is within a range of a first threshold value.

5. The spatial positioning method according to claim 4, wherein, the normalizing the coordinates of the selected at least four feature markers to determine the normalized coordinates further comprises:
   selecting one of the feature markers as an origin of the coordinate system corresponding to the normalized coordinates;
   calculating distances from other feature markers to the origin; and
   selecting a longest distance among the distances as a standard, and normalizing coordinates of other feature markers to obtain normalized coordinates of the other feature markers.

6. The spatial positioning method according to claim 1, wherein, the arbitrarily selecting the at least three of the feature markers to calculate the vector relations corresponding to the standard vector relations further comprises:
   arbitrarily selecting at least four and even number of the feature markers, and normalizing coordinates of the selected at least four feature markers to determine the normalized coordinates;
   calculating vector between every two feature markers according to the normalized coordinates; and
   determining second included angles between any two vectors with no intersection; and
   determining whether the calculated vector relations satisfy any standard vector relation, further comprises:
   determining whether the respective second included angles are within a range of a second threshold value.

7. The spatial positioning method according to claim 1, wherein, the determining the position information of the at least three feature markers according to the position information corresponding to the standard vector relations in the image coordinate system further comprises:
   determining a geometric shape to which the at least three feature markers belong according to the standard vector relations; and
   determining the position information of the respective feature markers in the geometric shape according to distance information and relative position relations among the at least three feature markers.

8. The spatial positioning method according to claim 1, wherein, there are multiple standard vector relations corresponding to a geometric shape; and
   determining whether the calculated vector relations satisfy any standard vector relation, further comprises:
   determining whether the calculated vector relations satisfy all standard vector relations corresponding to the geometric shape.

9. A non-transitory computer readable medium, comprising program codes configured for enabling a computing device to perform the spatial positioning method according to claim 1 when the program codes run on the computing device.

10. An infrared image capturing device, comprising: at least one processor and a memory, wherein the at least one processor is configured to read and execute programs stored in the memory to:
  capture a feature image containing multiple feature markers of an object that needs to be positioned; wherein at least one surface of the object that needs to be positioned has multiple feature markers, and geometric shapes formed by the feature markers on respective surfaces are different; determine coordinate positions of respective feature markers in the feature image in an image coordinate system; wherein the feature markers are luminous bodies or reflectors, and when the reflectors are used as the feature markers, the object that needs to be positioned is illuminated by specific light sources;
  traverse the respective feature markers in the image coordinate system according to preset multiple standard vector relations, arbitrarily select at least three of feature markers to calculate vector relations corresponding to the standard vector relations, and determine whether the calculated vector relations satisfy any standard vector relation;
  determine position information of the at least three feature markers according to position information corresponding to the standard vector relations in the image coordinate system when it is determined that the calculated vector relations satisfy any standard vector relation; and
  determine a relative position relationship between the object that needs to be positioned and an image capturing component, according to the position information of the feature markers and position information of the image capturing component.

11. The infrared image capturing device according to claim 10, wherein the at least one processor is further configured to read and execute programs stored in the memory to:
  perform binarization processing on the captured feature image;
  extract contours of the respective feature markers in the feature image subjected to the binarization processing; and
  determine contour moments of respective feature markers, and take center-of-mass coordinates of the contour moments of respective feature markers as coordinate positions of respective feature markers in the image coordinate system.

12. The infrared image capturing device according to claim 10, wherein the at least one processor is further configured to read and execute programs stored in the memory to:
  arbitrarily select at least four of the feature markers, and normalize coordinates of the selected at least four feature markers to determine the normalized coordinates;
  calculate vectors of other feature markers to one of the at least four feature markers according to the normalized coordinates, and sum the vectors;
  determine a first included angle between the vector sum and a set coordinate axis of a coordinate system corresponding to the normalized coordinates; and
  determine whether the first included angle is within a range of a first threshold value.

13. The infrared image capturing device according to claim 12, wherein the at least one processor is further configured to read and execute programs stored in the memory to:
  select one of the feature markers as an origin of the coordinate system corresponding to the normalized coordinates;
  calculate distances from other feature markers to the origin; and
  select a longest distance among the distances as a standard, and normalize coordinates of other feature markers to obtain normalized coordinates of the other feature markers.

14. The infrared image capturing device according to claim 10, wherein the at least one processor is further configured to read and execute programs stored in the memory to:
  arbitrarily select at least four of the feature markers, and normalize coordinates of the selected at least four and even number of feature markers to determine the normalized coordinates;
  calculate vectors between every two feature markers according to the normalized coordinates;
  determine second included angles between any two vectors with no intersection; and
  determine whether the respective second included angles are within a range of a second threshold value.

15. The infrared image capturing device according to claim 10, wherein the at least one processor is further configured to read and execute programs stored in the memory to:
  determine a geometric shape to which the at least three feature markers belong according to the standard vector relations; and
  determine the position information of the respective feature markers in the geometric shape according to distance information and relative position relations among the at least three feature markers.

16. The infrared image capturing device according to claim 10, wherein there are multiple standard vector relations corresponding to a geometric shape; and
  the at least one processor is further configured to read and execute programs stored in the memory to: determine whether the calculated vector relations satisfy all standard vector relations corresponding to any geometric shape.

17. A spatial positioning system, comprising: infrared image capturing device, and an object that needs to be positioned; wherein
  the infrared image capturing device comprises: at least one processor and a memory, wherein the at least one processor is configured to read and execute programs stored in the memory to:
  capture a feature image containing multiple feature markers of the object that needs to be positioned; wherein at least one surface of the object that needs to be positioned has multiple feature markers, and geometric shapes formed by the feature markers on respective surfaces are different wherein the feature markers are luminous bodies or reflectors, and when the reflectors are used as the feature markers, the object that needs to be positioned is illuminated by specific light sources;
  determine coordinate positions of respective feature markers in the feature image in an image coordinate system;
  traverse the respective feature markers in the image coordinate system according to preset multiple standard vector relations, arbitrarily select at least three of feature markers to calculate vector relations corresponding to the standard vector relations, and determine whether the calculated vector relations satisfy any standard vector relation;

determine position information of the at least three feature markers according to position information corresponding to the standard vector relations in the image coordinate system when it is determined that the calculated vector relations satisfy any standard vector relation; and determine a relative position relationship between the object that needs to be positioned and an image capturing component, according to the position information of the feature markers and position information of the image capturing component;

wherein at least one surface of the object that needs to be positioned is provided with multiple feature markers, and geometric shapes formed by the feature markers on respective surfaces are different.

* * * * *